United States Patent [19]

Shimada et al.

[11] Patent Number: 5,057,739
[45] Date of Patent: Oct. 15, 1991

[54] MATRIX ARRAY OF CATHODE RAY TUBES DISPLAY DEVICE

[75] Inventors: Satoshi Shimada; Ryuichi Kawakami; Takehisa Natori, all of Kanagawa; Koji Kanbayashi, Chiba, all of Japan

[73] Assignee: Sony Corporation, Tokyo, Japan

[21] Appl. No.: 458,456

[22] Filed: Dec. 28, 1989

[30] Foreign Application Priority Data

Dec. 29, 1988 [JP] Japan ................................ 63-331505
Jan. 31, 1989 [JP] Japan .................................... 1-21183

[51] Int. Cl.$^5$ ............................................ H01J 31/00
[52] U.S. Cl. .................... 313/477 R; 313/461; 313/493
[58] Field of Search ............... 313/408, 461, 463, 466, 313/476, 482, 477, 496, 582, 470, 493; 343/760

[56] References Cited

U.S. PATENT DOCUMENTS

| | | | |
|---|---|---|---|
| 2,337,980 | 12/1943 | Du Mont et al. | 313/461 |
| 3,952,221 | 4/1976 | Kamegaya et al. | 313/493 |
| 4,070,596 | 1/1978 | Tsuneta et al. | 313/470 |
| 4,590,404 | 5/1986 | D'Amato | 220/2.1 A |
| 4,635,105 | 1/1987 | Favreau | 313/477 R |
| 4,810,928 | 3/1989 | Yamazaki | 313/461 |
| 4,900,977 | 2/1990 | Lopata et al. | 313/482 |

Primary Examiner—Donald J. Yusko
Assistant Examiner—Diab Hamadi
Attorney, Agent, or Firm—Hill, Van Santen, Steadman & Simpson

[57] ABSTRACT

A large area display has a plurality of cathode ray tubes mounted adjacent each other in X, Y matrix and each cathode ray tube includes a plurality of pixels arranged in an X, Y matrix on a front panel and each pixel comprises three horizontally extending stripe-shaped luminous elements aligned in the vertical direction and the front panel of the cathode ray tube is formed with a thinner portion adjacent its outer edge where it joins to the funnel to reduce the spacing between adjacent cathode ray tubes to a minimum to allow the pixels to be viewed over a wider angle.

9 Claims, 14 Drawing Sheets

FIG. 14

FIG. 17
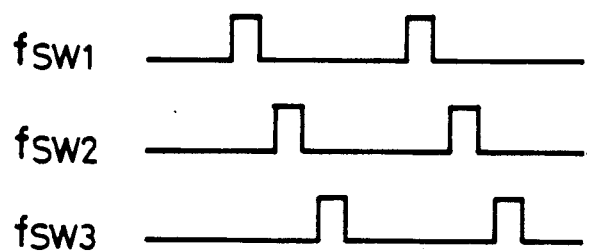
FIG. 16A
Scanning Order
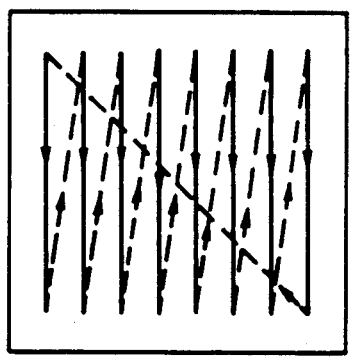
FIG. 16B
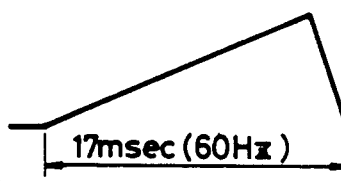
Horizontally-deflected Waveform (H$_{CM}$) ⟵ 17msec (60Hz) ⟶
Vertically-deflected Waveform (V$_{CM}$) ⟵ 2msec (480Hz) ⟶
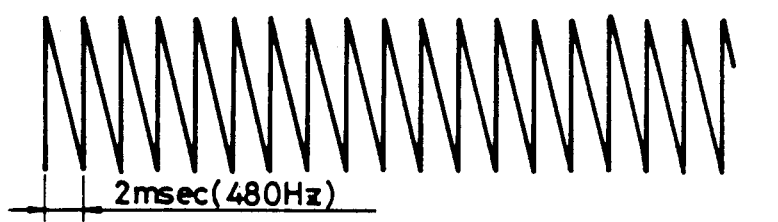

MATRIX ARRAY OF CATHODE RAY TUBES DISPLAY DEVICE

BACKGROUND OF THE INVENTION

1. Field of the Invention

The present invention relates generally to display devices (so-called display cells) for use with a large screen display apparatus and particularly to a display device for use with an indoor-type large screen display apparatus employing a cathode ray tube.

2. Description of the Prior Art

In the prior art, a large screen display apparatus is constructed by assembling a plurality of existing television receivers in the vertical and horizontal directions as shown in FIG. 1 or the large screen display apparatus is constructed by assembling a plurality of liquid crystal display devices similarly as described above.

Alternatively, as shown in FIG. 2, an 8-element display device 35 or the like is proposed (see Japanese Patent Laid-Open Gazette No. 60-191703). According to the 8-element display device 35, a plurality of, for example, 8 sets of fluorescent trios 34, each formed of green, red and blue three primary color fluorescent layers G, R and B forming a pixel are provided within a glass tube envelope 33 formed of a front panel 31, a rear panel (not shown) and a side plate 32. The display devices 35 are arranged in a two-dimensional manner, thereby forming a large-sized display apparatus as shown in FIG. 1 or 2. This type of large-sized display apparatus provides sufficient brightness so that it can reproduce a clear visual image even outdoors.

Further, as the large screen display apparatus, a matrix display is known, in which a cathode ray tube 36 is utilized as a display cell as shown in FIG. 3.

In the prior-art large screen display apparatus formed of display devices, for example, in the large screen display apparatus in which a plurality of cathode ray tubes 41 are provided as shown in FIG. 1, however, a connected portion between the adjacent cathode ray tubes 41 and 41 causes a cross bar 42, which deteriorates the quality of image considerably. More specifically, as shown in FIG. 4, in the case of the cathode ray tube 41 formed by the tube envelope which is comprised of a panel 44 of non-flat plate shape having a fluorescent screen 43 formed on its inside surface and a funnel portion 45, a panel-funnel connected portion needs a proper thickness $t_1$ from a mechanical strength and dielectric strength standpoint. For example, the limit of the thickness of, for example, a 4-inch cathode ray tube falls in a range of from 2.5 mm to 3 mm. As a result, a useless portion 1 between the adjacent cathode ray tubes 41 and 41 is large and this large useless portion 1 becomes a cross bar, resulting in the image quality to be deteriorated. In FIG. 4, reference letter m represents the effective portion.

As shown in FIG. 5, a viewfinder for a video camera utilizes a cathode ray tube 54 wherein a tube envelope 53 is formed of a flat panel 51 of flat-shaped glass and a funnel portion 52. In FIG. 5, reference letter 55 designates a fluorescent screen, and 56 an electron gun. Generally, a viewfinder of about 0.7-inch is applied with a high voltage of less than 5 kV, for example, 2 kV so that a thickness $t_2$ of the funnel portion 52 of the tube envelope thereof is sufficient of about 1 mm from a mechanical strength and dielectric strength standpoint. However, if this type of viewfinder is formed as 4-inch type or the like, then this 4-inch type viewfinder needs large mechanical strength and dielectric strength with the result that the funnel of about 1 mm thick can not be employed.

In the large screen display apparatus shown in FIG. 2, each of the fluorescent trios 34 is formed as a rectangular strip configuration and the longitudinal direction of the fluorescent trios 34 is aligned in the vertical direction of the display screen so that the following problems arise. As, for example, shown in FIG. 6, when the viewer watches the picture screen from a relatively lateral direction relative to the display picture screen (this situation is inavoidable when many viewers watch the same display screen because a space in which the display apparatus is located indoors is small), of the fluorescent trio series 34l and 34r existing at respective sides of the picture screen, the fluorescent series located at the endmost of the picture screen are hidden by a frame 37, so that the fluorescent trio series 34l and 34r existing at the respective sides can not function to display a visual image. More specifically, as shown in FIG. 6, in the case of a viewer Hl who watches the picture screen from the left-hand side, of the leftmost fluorescent trio series (area shown by a one-dot chain line) 34l, the leftmost fluorescent series G is hidden by the frame 37, whereby the visual image displayed by the fluorescent trio series 34l does not appear to have natural color but has a predetermined color (magenta, which should be originally white) for the viewer Hl. The above-mentioned fluorescent trio series 34l does not function as a fluorescent trio for displaying the visual image. This is also true for a viewer Hr who watches the picture screen from the right-hand side. That is, the fluorescent trio series 34r located in the rightmost position of the picture screen appears to have a predetermined color (in that case, yellow), and can not function as the fluorescent trio by which the visual image is displayed.

Accordingly, when the large screen display apparatus is constructed by the conventional display elements, a visual field $A_1$ of the visual image distant by a predetermined distance n of the display apparatus must be considered in practice excepting the fluorescent trio series 34l and 34r at the respective side ends so that the visual field $A_1$ is reduced to a visual field $A_2$ as shown in FIG. 6. Therefore, the function (to enable to many viewers to watch the same large screen) of the large screen display apparatus can not be demonstrated sufficiently.

Further, as shown in FIG. 2, the glass tube envelope 33 has to have a sufficient thickness from a mechanical strength and dielectric strength standpoint, and thus a resolution can not be sufficiently increased by reducing the pitch of the fluorescent trio 34.

OBJECTS AND SUMMARY OF THE INVENTION

Accordingly, it is an object of the present invention to provide an improved large screen display apparatus which can eliminate the defects encountered with the prior art.

More specifically, it is an object of the present invention to provide an improved display panel formed of picture cells suitably used to form a large picture display apparatus and which can obviate the shortcomings of the prior art.

It is another object of the present invention to provide an improved large screen display apparatus in which bonding portions between adjacent picture cells can be made inconspicuous.

It is still another object of the present invention to provide an improved large screen display apparatus in which a range of visual field can be enlarged and a function of large screen can be sufficiently demonstrated.

It is still another object of the present invention to provide an improved large screen display apparatus in which mechanical strength and dielectric strength of a tube envelope can be increased.

It is a further object of the present invention to provide an improved large screen display apparatus in which a visual field angle can be increased.

It is a still further object of the present invention to provide a large screen display apparatus in which a thickness of a picture screen side wall portion of a funnel can be reduced, thereby providing an image of high resolution.

According to a first aspect of the present invention, there is provided a display panel formed by arranging a plurality of picture cells in a XY matrix form. In each picture cell, a plurality of slit-shaped self luminous pixel elements are formed on a display screen of a tube envelope in a predetermined pitch so that their longitudinal directions are directed in the horizontal direction of the display screen. Thus, a large screen display apparatus can be made, in which a bonding portion between the adjacent picture cells acts as a light absorption area, so that upon reproduction, a bonded portion between adjacent pictures can be made inconspicuous.

According to a second aspect of the present invention, a phenomenon in which one of fluorescent trios located at the side end portions is hidden by the frame when the user watches the display screen from the lateral direction is avoided. Therefore, a range of visual field relative to a predetermined distance can be enlarged and the function of a large screen can be sufficiently demonstrated.

According to a third aspect of the present invention, there is provided a cathode ray tube for use with a large display screen, in which a stepped portion is provided on the peripheral edge portion of a flat panel having a fluorescent screen formed on its inner surface, and a funnel portion is bonded to this stepped portion. According to the cathode ray tube of the present invention, in the above-mentioned tube envelope, the thickness the funnel at its bonding portion in which the funnel is bonded to the panel is reduced more than the thickness of other portions of the funnel.

In the large screen display apparatus of the present invention, i.e., in a large screen display apparatus in which a plurality of cathode ray tubes are arranged in a XY matrix-fashion, there is utilized a cathode ray tube in which the stepped portion of the flat panel on its peripheral edge portion is provided outside of a line connecting the fluorescent element adjacent to the stepped portion and the end portion of the flat panel. Thus, regardless of the reduced thickness of the funnel, the mechanical strength of the frit-bonded portion between the panel and the funnel will be large. Also, the length of the frit-bonded portion is increased, thereby increasing dielectric strength. Further, a loss of visual field angle due to the thickness of the funnel can be removed, thereby enlarging the visual field angle.

Furthermore, in the above-described cathode ray tube, the thickness of the funnel at its bonding portion in which the funnel and the panel are bonded is reduced, whereby the screen side wall portion of the tube envelope can be reduced in thickness. Thus, when this kind of cathode ray tube is applied to a large screen display apparatus, the display apparatus can provide a visual image of high resolution.

The above, and other objects, features and advantages of the present invention will become apparent from the following detailed description of preferred embodiments when read in conjunction with the accompanying drawings, in which like reference numerals are used to identify the same or similar parts in the several views.

BRIEF DESCRIPTION OF THE DRAWINGS

FIG. 14 is a block diagram of an image processor circuit used in the circuit of FIG. 13, and to which reference will be made in explaining an operation of the image processor circuit;

FIGS. 16A and 16B are schematic diagrams to which reference will be made in explaining the scanning order and horizontal and vertical deflection waveforms, respectively;

FIG. 17 is a timing chart of switching signals, and to which reference will be made in explaining the operation of the present invention;

DETAILED DESCRIPTION OF PREFERRED EMBODIMENTS

The present invention will now be described with reference to FIGS. 7 to 18.

Figure 7:
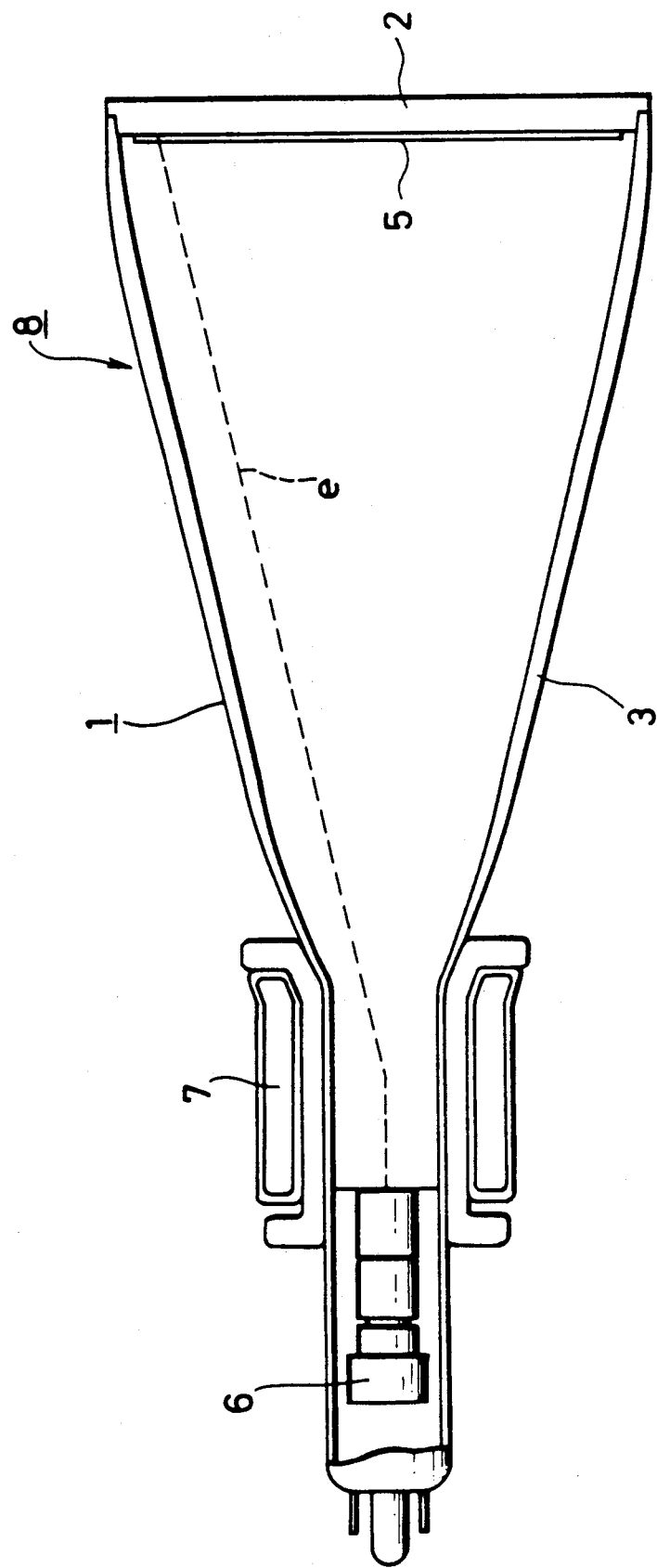
FIG. 7 is a diagrammatic view of a section of a cathode ray tube according to an embodiment of the present invention.
Figure 8A:
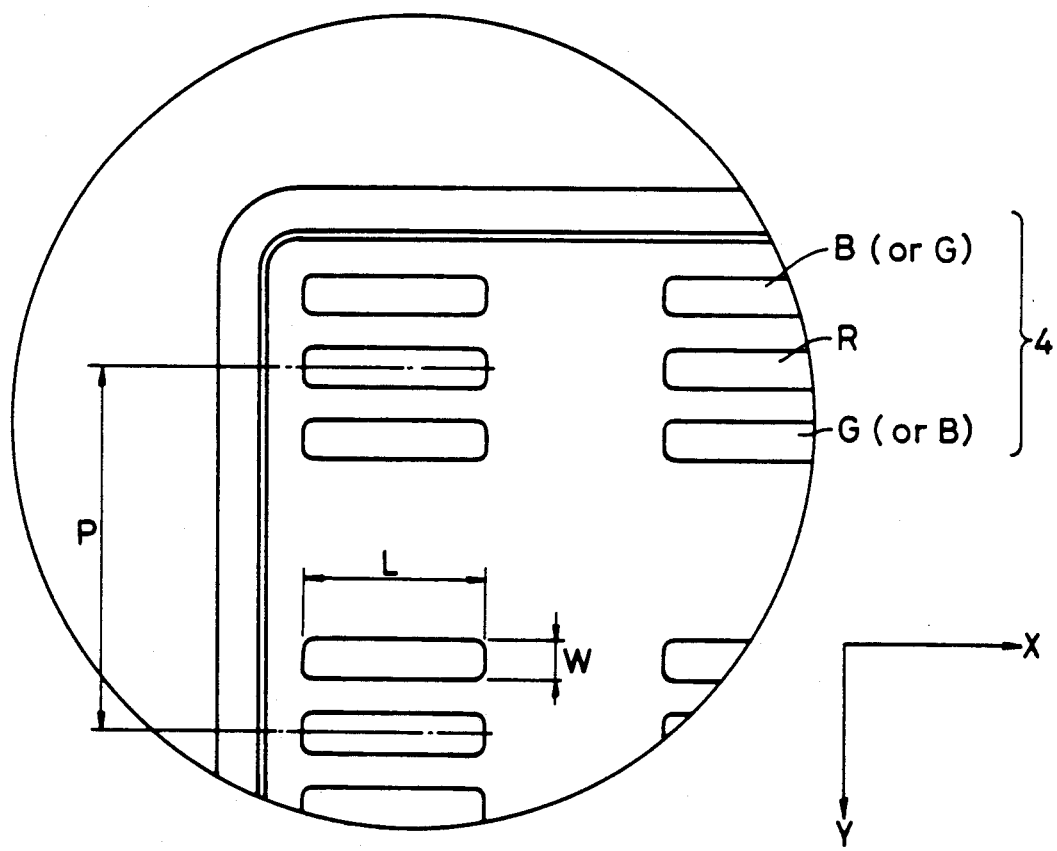
FIG. 8 is a front view of FIG. 7.
Figure 8B:
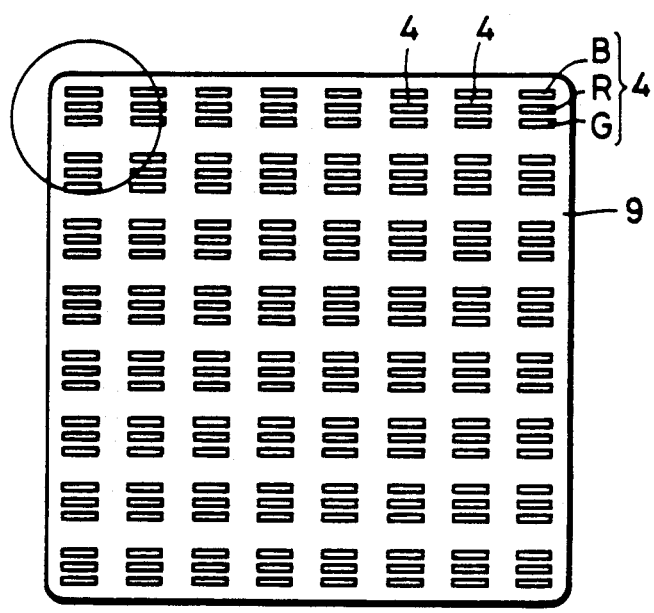
Figure 9:
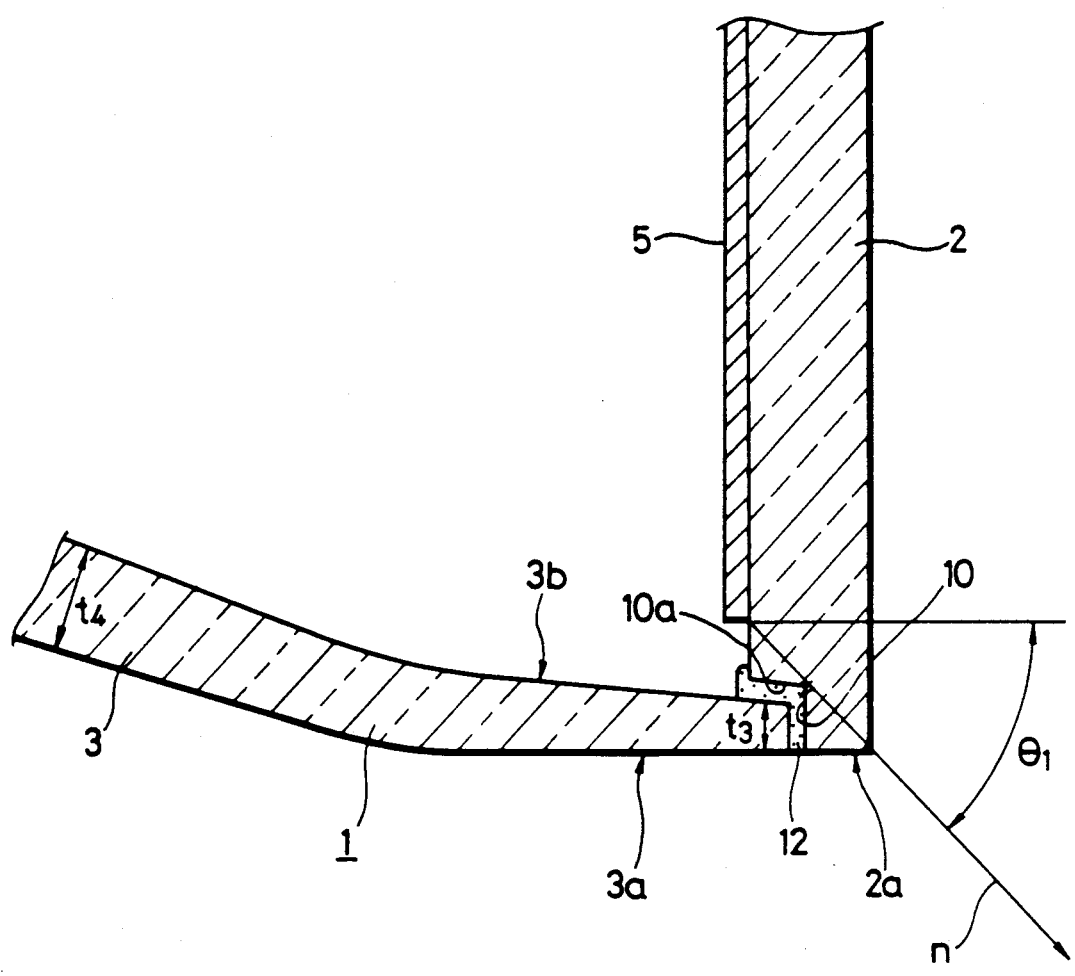
FIG. 9 is a view of a section of a main component of the cathode ray tube, and to which the present invention can be advantageously applied.

FIG. 7 is a side view of a section of a cathode ray tube (cathode ray tube suitably used as large screen display element), and to which the present invention can be advantageously applied. FIG. 8 is a front view of FIG. 7, and FIG. 9 is a side view of a section of a main component of the cathode ray tube of FIG. 7.

In the figures, it will be seen that a tube envelope 1 is comprised of a glass flat panel 2 and a glass funnel portion 3 which is formed as one body with the necked-down portion. On the inner surface of the flat panel 2, there is formed a fluorescent screen 5 which is formed of stripe-shaped fluorescent display portions which form a plurality of sets of pixels, i.e., in this embodiment, $8 \times 8 = 64$ (in total) sets of so-called fluorescent trios 4. As shown in FIG. 8, each of the fluorescent trios 4 is formed of blue light-emission, red light-emission and green-light emission fluorescent layers B, R and G, each having a length L and a width W. These fluorescent trios 4 are arranged with a predetermined pitch P and the longitudinal directions of the fluorescent layers B, R and G are aligned in the horizontal direction relative to the display screen 9, i.e., in the X direction. Light absorption layers are formed on the surface other than the fluorescent layers B, R and G.

The flat panel 2 and the funnel 3 are bonded to each other by using a frit glass 12. In this embodiment, as shown in FIG. 9, a stepped-portion 10 is formed on the inner peripheral edge portion of the flat panel 2 formed of a flat-shaped glass, and the end portion of the funnel 3 is bonded to the stepped-portion 10.

In the funnel 3 side, its outer peripheral surface 3a near the area to be bonded to the flat panel 2, i.e., the picture screen side wall portion is formed so as to be flush with the side surface 2a of the panel 2. In other words, the outer peripheral surface 3a is formed so as to extend in the direction vertical to the plane of the flat panel 2.

Further, as shown in FIG. 9, the inside surface 3b of the funnel 3 at the picture screen side wall portion is tapered so that the thickness of the funnel 3 is gradually reduced toward the bonded end thereof. At the stepped portion 10 of the panel 2, the inner side wall 10a is tapered to correspond with the tapered inside surface 3b of the funnel 3. The stepped portion 10 is formed outside a line n connecting the fluorescent material adjacent to the stepped portion 10, i.e., the fluorescent material located at the rightmost position of the fluorescent screen 5 and the end portion of the flat panel 2. The fluorescent trios 4 may be produced by either a printing method or a so-called slurry method.

As shown in FIG. 7, an electron gun 6 may be of a type from which is emitted a single electron beam e. By three switching operations, the electron beam is deflected in the vertical and horizontal directions by a deflection yoke 7 so that it impinges upon the blue fluorescent layer B, the red fluorescent layer R and the green fluorescent layer G of one fluorescent trio 4. It is desirable that the shape of laser beam may be a laterally-extended beam shape (e.g., ellipse) in accordance with the shape of the fluorescent layer.

In this embodiment, since the longitudinal directions of the fluorescent trios 4 are aligned in the X direction, unlike the prior-art scanning method, i.e., the method in which the electron beam is scanned in the horizontal direction (X direction) so as to impinge upon the fluorescent layers B, R and G, the electron beam is scanned in the vertical direction (Y direction) so as to impinge upon the fluorescent layers B, R and G. A practical scanning operation and scanning means will be described in the later stage.

Figure 10:
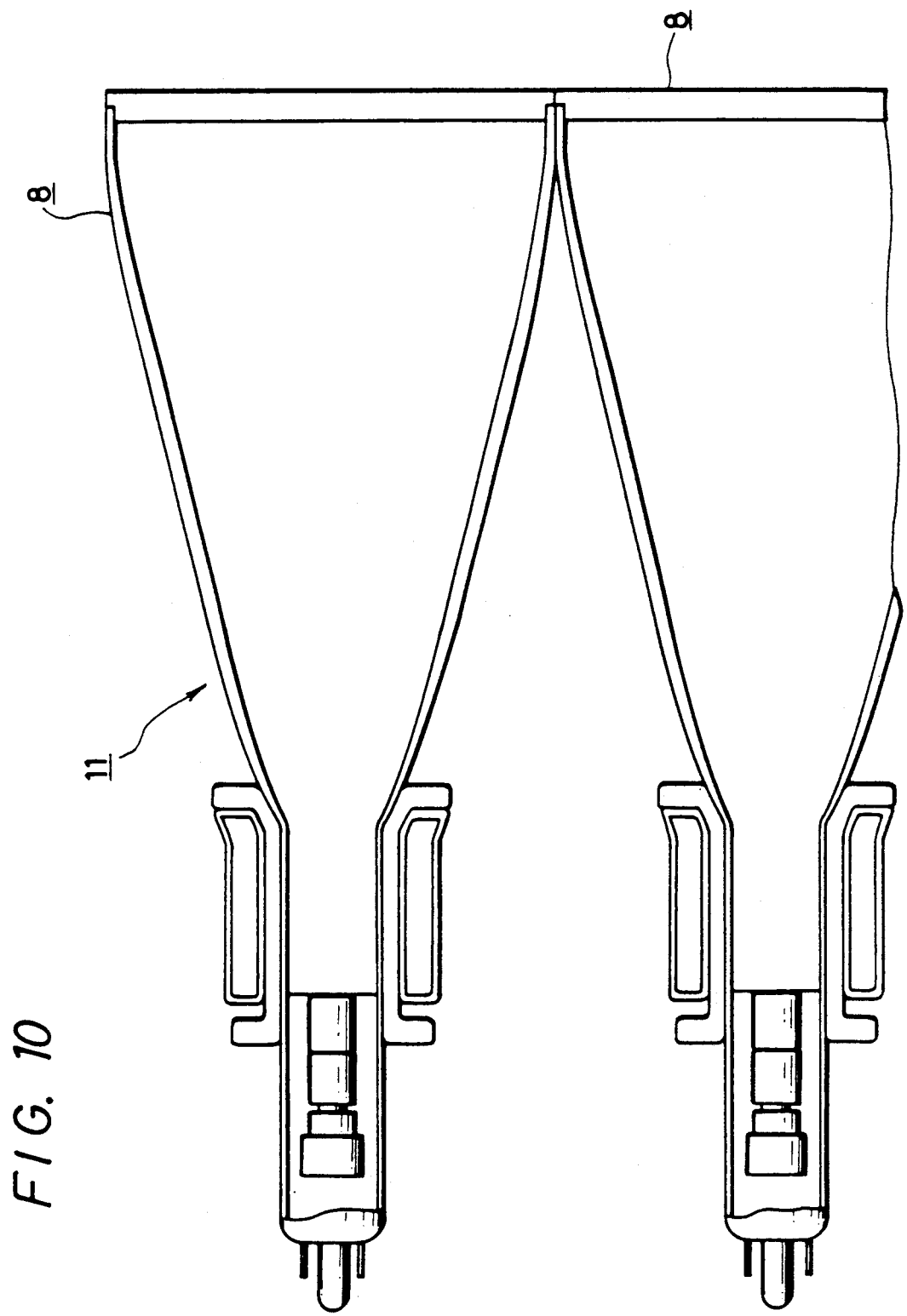
FIG. 10 is a schematic diagram showing a large screen display apparatus according to the present invention.
Figure 11:
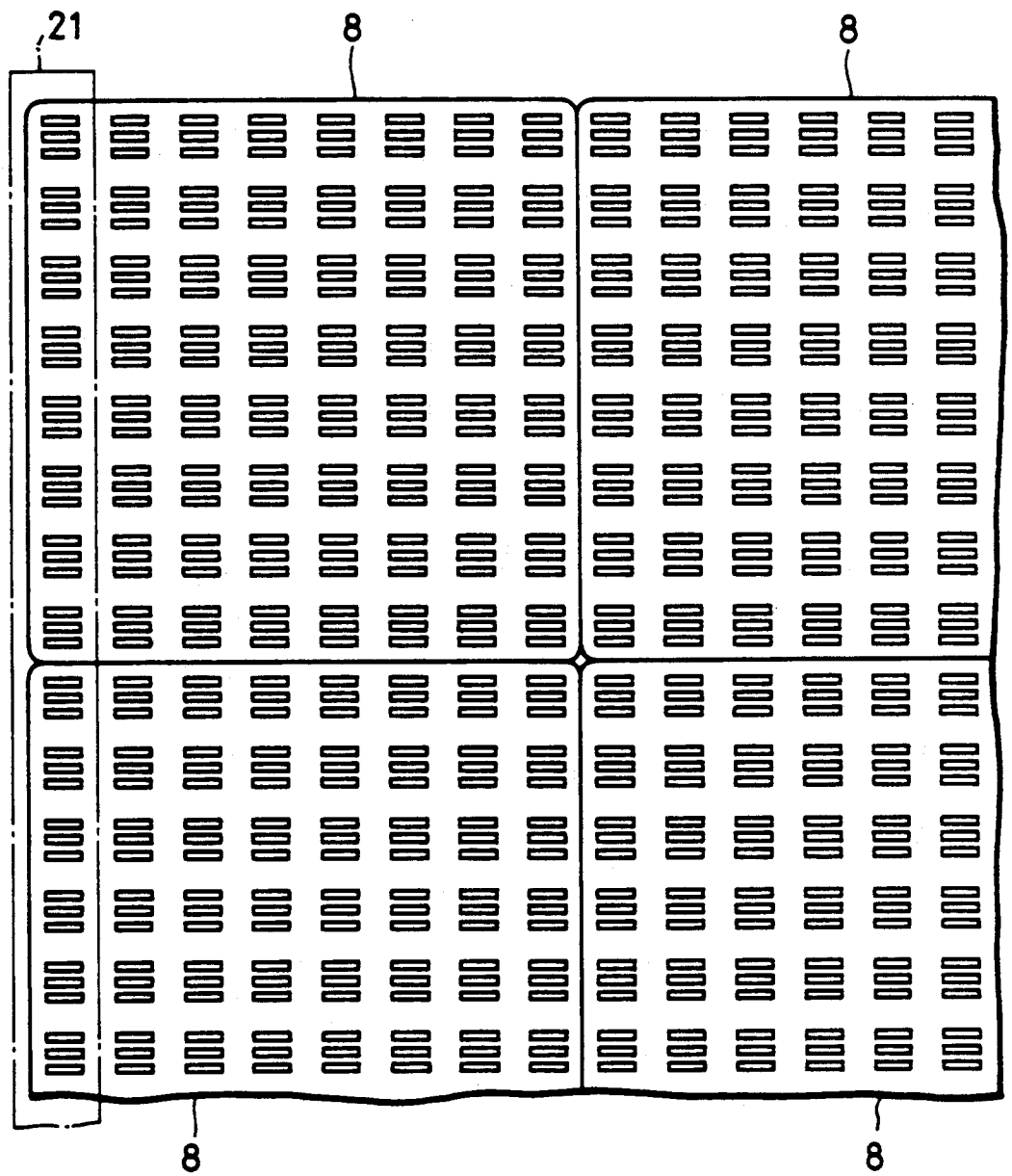
FIG. 11 is a front view of FIG. 10.
Figure 12:
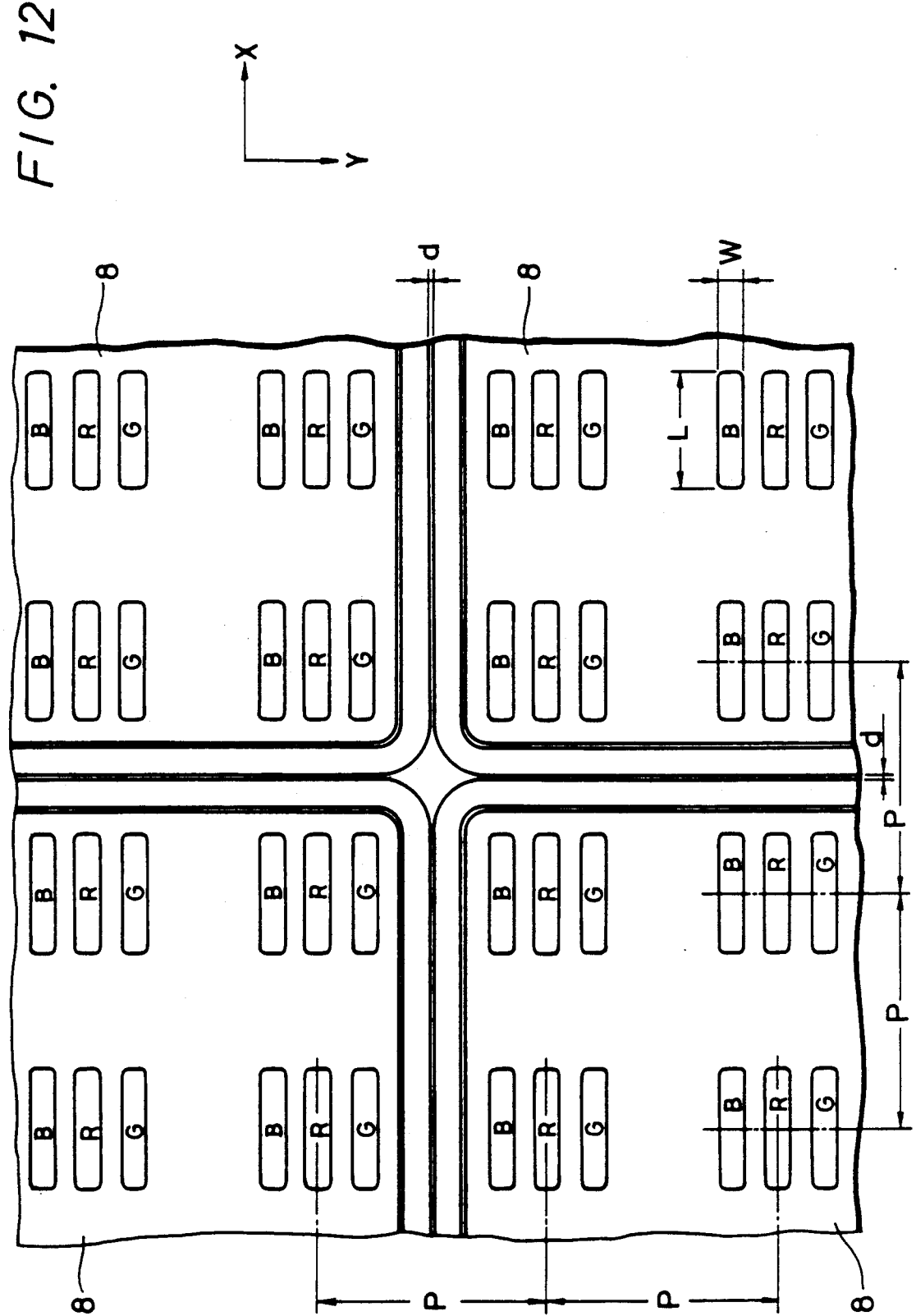
FIG. 12 is an enlarged, front view of a large screen display apparatus according to the present invention.

By arranging a number of the thus arranged cathode ray tubes in a two-dimensional fashion or in a XY matrix form, it is possible to form a large screen display apparatus 11 in which the spacing between the adjacent cathode ray tubes is represented by d (see FIG. 12), as shown in FIGS. 10 and 11.

In this embodiment, 30 cathode ray tubes are arranged in the longitudinal direction, and 40 cathode ray tube are arranged in the lateral direction, i.e., 1,200 cathode ray tubes are arranged, thereby constructing the large screen display apparatus 11.

The operation of the large screen display apparatus 11 and an example of a circuitry for effecting the operation of the large screen display apparatus 11 will be described with reference to FIGS. 13 to 17.

Figure 13:
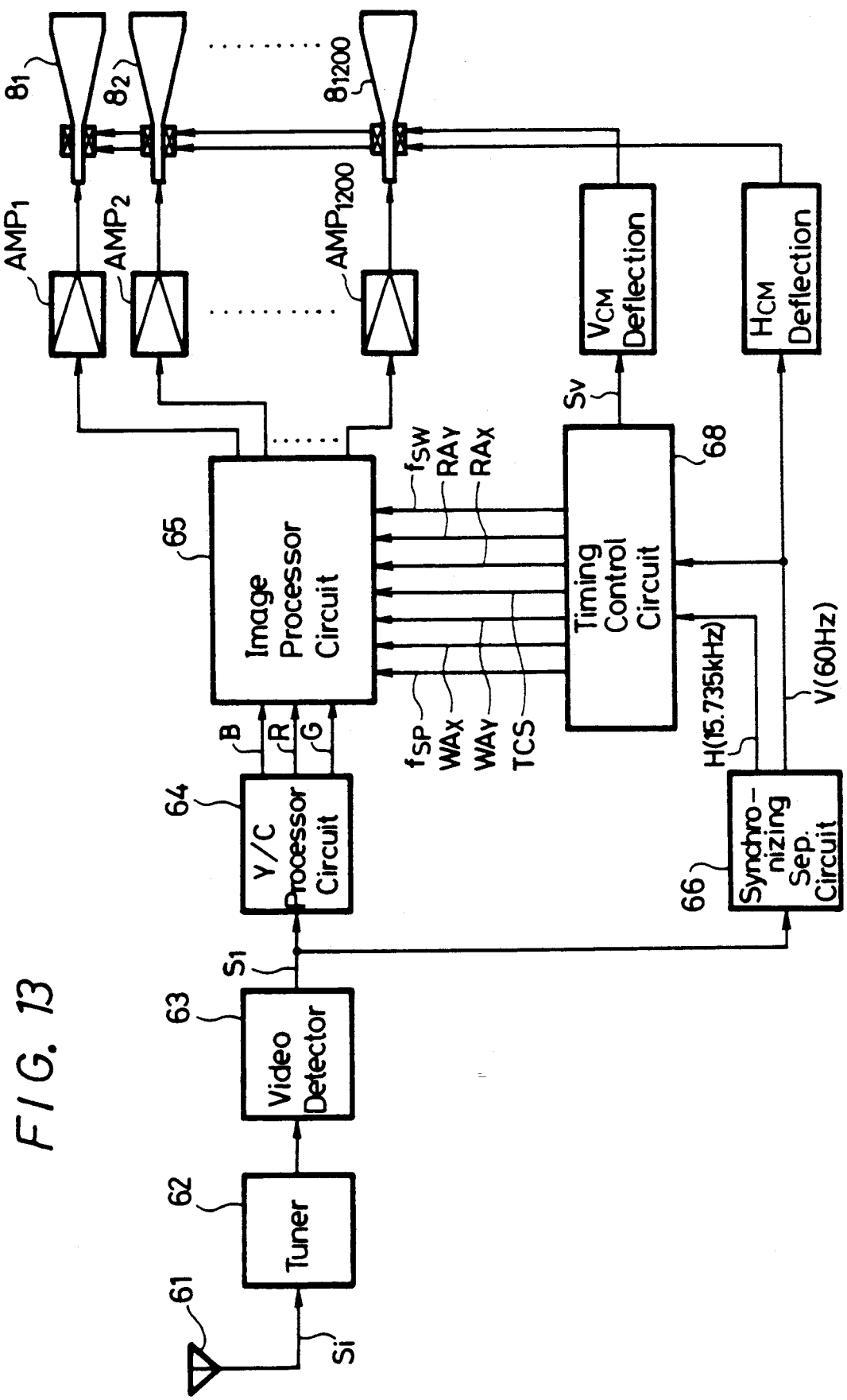
FIG. 13 is a block diagram showing an example of drive means for driving the large screen display apparatus according to the present invention.

FIG. 13 is a block diagram, and shows a television signal Si which is received at an antenna 61 and is supplied through a tuner 62 to a video detector 63, in which it is demodulated to provide a composite video signal $S_1$. This video signal $S_1$ is supplied to a luminance-/chroma signal processing circuit (Y/C processor circuit) 64, in which it is processed to provide blue, red and green three primary color signals R, G and B. The three primary color signals B, R and G are supplied to a succeeding image processor circuit 65. The antenna circuit 61, the tuner 62, the video detector 63 and the Y/C processor circuit 64 are those employed for receiving a standard television signal. These elements do not have any special features and therefore need not be described in detail.

The composite video signal $S_1$ from the video detector 63 is supplied to a synchronizing separating circuit 66, in which it is separated to provide a horizontal synchronizing signal H and a vertical synchronizing signal V.

Figure 14:
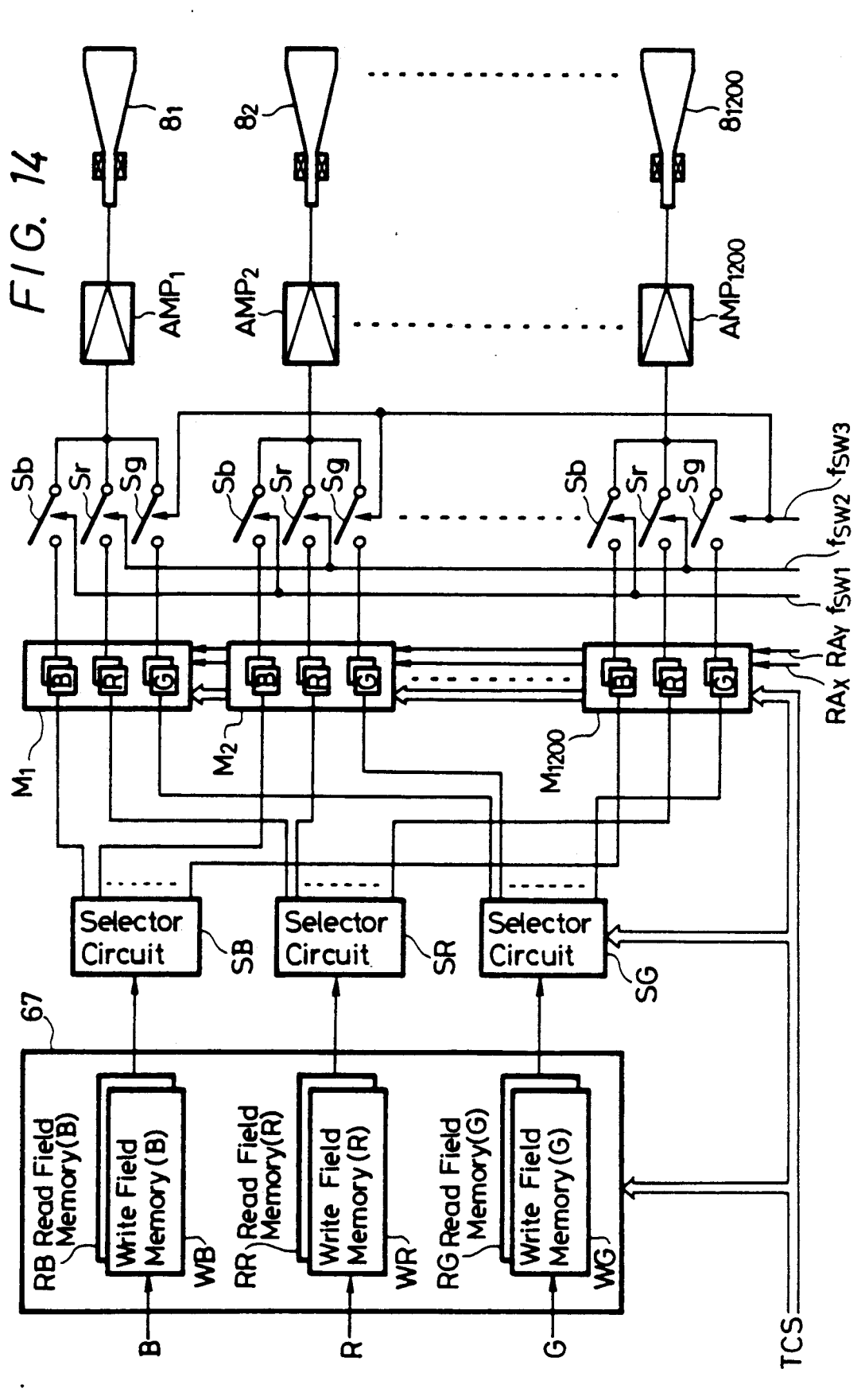

The image processor circuit 65 is mainly formed of a field memory circuit 67 as shown in FIG. 14. The field memory circuit 67 is adapted to store the three primary color signals B, R and G which are inputted thereto from the Y/C processor circuit 64 in units of fields. More specifically, as shown in FIG. 14, the field memory circuit 67 is provided with write field memories WB, WR and WG and read field memories RB, RR and RG for the three primary color signals B, R and G. That is, the field memory circuit 67 is provided with 6 field memories.

The large screen display apparatus 11 according to this embodiment utilizes 1,200 cathode ray tubes 8 (30 cathode ray tubes in the longitudinal direction and 40 cathode ray tubes in the lateral direction) and each cathode ray tube 8 is formed of $8 \times 8 = 64$ fluorescent trios 4. Accordingly, one field memory has to store at least $64 \times 1,200 = 76,800$ informations. To this end, as shown in FIG. 13, the horizontal and vertical synchronzing signals H and V from the synchronizing separating circuit 66 are supplied to a timing control circuit 68, which then supplies to the image processor circuit 65 a sampling signal fsp. More specifically, the timing control circuit 68 generates various timing signals, and the three primary color signals R, G and B are sampled by the above described sampling signal fsp. Simultaneously, other timing signals derived from the timing control circuit 68, i.e., write address signals WAx and WAy are used to control the write field memories WB, WR and WG so that the write field memories WB, WR and WG correctly write the three primary color signals B, R and G, in that order. In this case, althrough the frequency of the sampling signal fsp could be selected to be a frequency corresponding to 76,800 sampling operations, because the standard field memory for visual image has a sampling frequency more than 76,800, it is practical that the field memory for visual image is used as it is wherein the read address for the field memory is controlled so as to obtain necessary information.

The signals, written in the write field memories WR, WB and WG line by line as set forth above, are transferred to small memories $M_1, M_2, \ldots, M_{1,200}$ that are provided to drive the cathode ray tubes during the next field scanning period, for example, the vertical blanking period. To this end, the timing control circuit 68 delivers a transfer control signal TCS. Although the line of the control signal TCS is represented by a single line in FIG. 13, the line of the control signal TCS is formed of lines of address signals used to read the write field memories WB, WR and WG, address signals to write data in the small memories $M_1, M_2, \ldots M_{1,200}$ for driving the respective cathode ray tubes, control signals for driving selector circuits SB, SR and SG provided between the field memory 67 and the small memories $M_1, M_2, \ldots M_{1,200}$ or the like as shown in FIG. 14.

Each of the small memories $M_1, M_2, \ldots, M_{1,200}$ includes write and read special memories, i.e., 6 special memories for the three primary color signals B, R and G similarly to the above-mentioned field memory 67. Each special memory is arranged to store therein at least 64 informations because each cathode ray tube 8 is provided with $8 \times 8 = 64$ fluorescent trios 4.

Figure 15B:
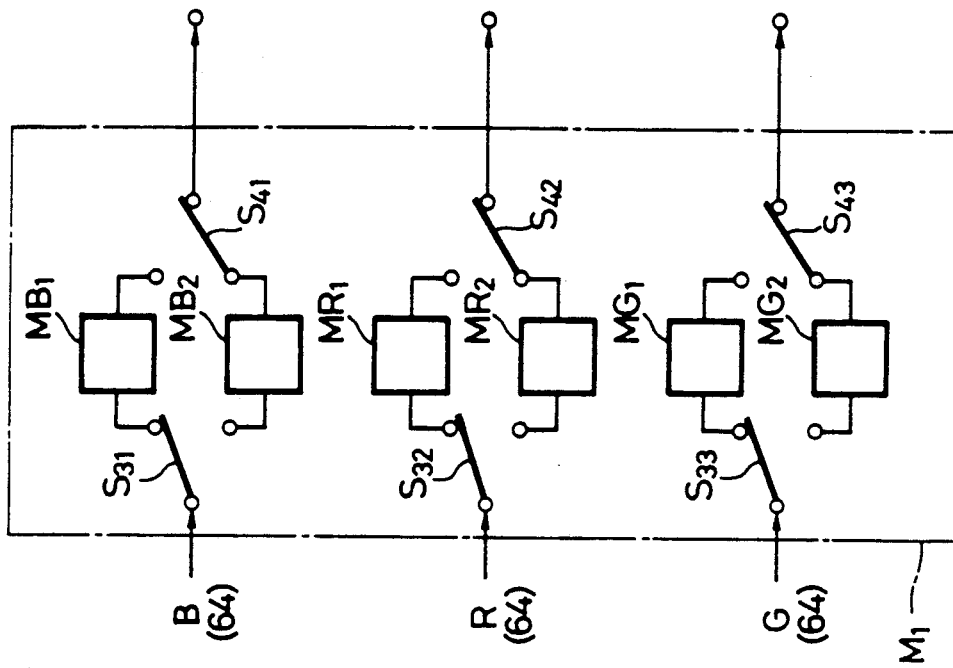
FIGS. 15A and 15B are block diagrams of a field memory circuit and an exclusive small memory, and to which reference will be made in explaining the operation of the present invention, respectively.
Figure 15A:
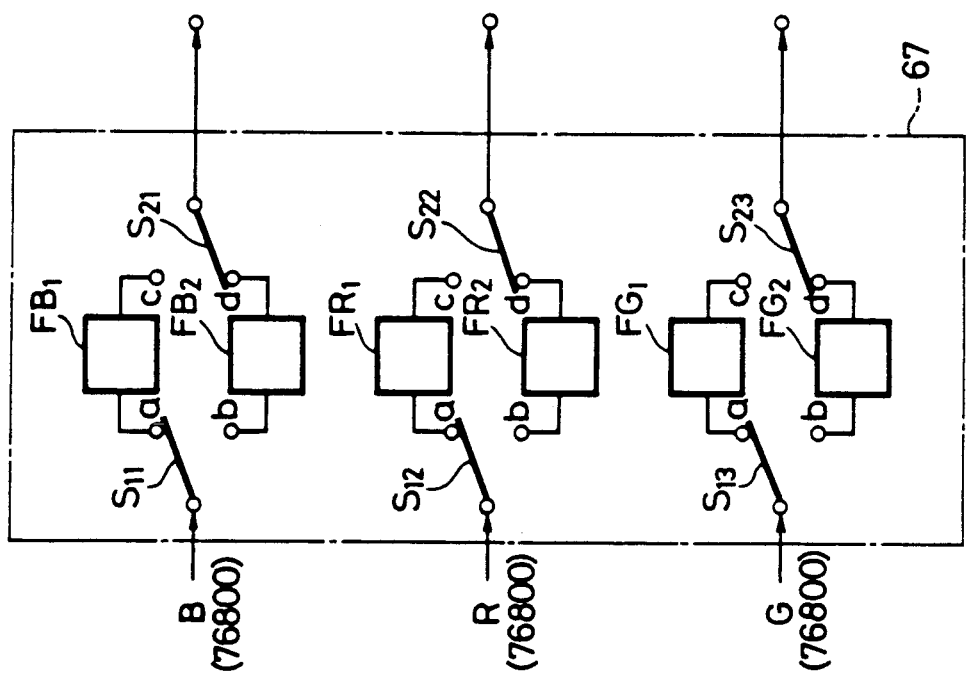
Figure 18:
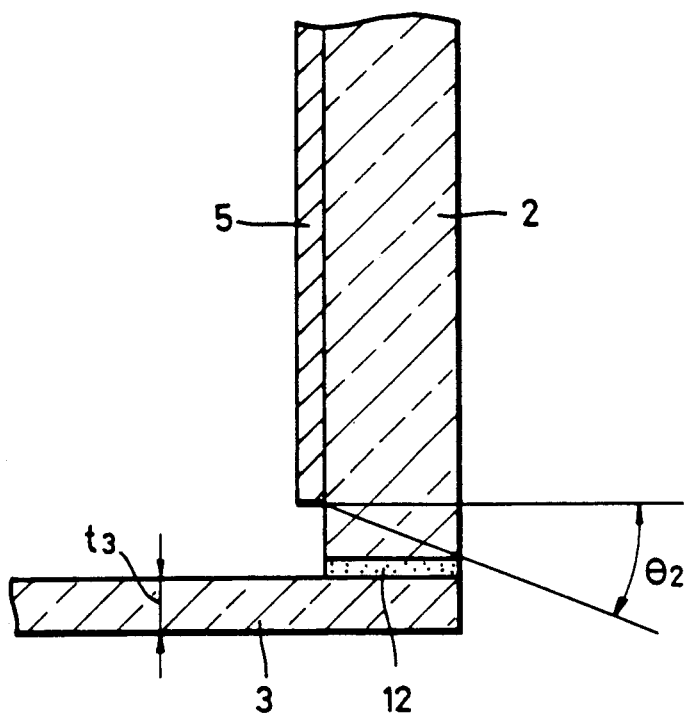
FIG. 18 is a diagrammatic view of a section to which reference will be made in explaining the present invention.

While the field memory 67 is separated into the read field memories RB, RR and RG and the write field memories WB, WR and WG for convenience of explanation or in order to understand the present invention more easily, such a variation is possible. According to this embodiment, as shown in FIG. 15A, two read and write field memories $FB_1$ and $FB_2$ for one primary color signal, for example, blue signal B are used and switches $S_{11}$ and $S_{21}$ are changed in position, whereby the field memories $FB_1$ and $FB_2$ are cyclically selected as the read memory or the write memory. When data of, for example, the first field is written, for example, in the field memory $FB_1$, the switches $S_{11}$ and $S_{21}$ are respectively connected to their fixed contacts a and d. In that event, data of the preceding field may be read from the other field memory $FB_2$ and transferred to the small memories $M_1, M_2, \ldots, M_{1,200}$. Data of the second field is written in the vacant other field memory $FB_2$ by connecting the switch $S_{11}$ to its fixed contact b. Simultaneously, the data of the first field is read to the small memories $M_1, M_2, \ldots, M_{1,200}$ by connecting the switch $S_{21}$ to its fixed contact c. Other field memories $FR_1$, $FR_2$ and $FG_1$, $FG_2$ are operated similarly, and read and write thereof are respectively selected by switches $S_{12}$, $S_{22}$ and $S_{13}$, $S_{23}$. These operations are repeatedly carried out, whereby the three primary color signals B, R and G sequentially delivered are read to the small memories $M_1, M_2, \ldots, M_{1,200}$.

While in this embodiment the switches $S_{11}, S_{12}, S_{13}, S_{21}, S_{22}$ and $S_{23}$ are simultaneously operated thereby effecting the write and read at the same time, the following variant is also possible. That is, the vertical blanking period in the input scanning is utilized such that during the vertical blanking period, the switches $S_{11}, S_{12}, S_{13}$ and the switches $S_{21}, S_{22}, S_{23}$ are operated with different phases, whereby informations are read from one memories first and then informations read are written in the other memories.

Each of the small memories $M_1, M_2, \ldots, M_{1,200}$ includes two read and write memories $MB_1, MB_2, MR_1, MR_2, MG_1, MG_2$ for the three primary color signals similarly to the above-mentioned field memory circuit 67. The read and write of these memories $MB_1, MB_2, MR_1, MR_2$ and $MG_1, MG_2$ can be selected by switches $S_{31}, S_{32}, S_{33}$ and switches $S_{41}, S_{42}, S_{43}$.

In the field memory circuit 67, image signals B, R and G, stored in the field memories $FB_1$, $FR_1$ and $FG_1$, which are placed in the read mode by connecting the switches $S_{21}, S_{22}$ and $S_{23}$ to their fixed contact c, are transferred through the selector circuits SB, SR and SG to the special memories of the respective small memories $M_1, M_2, \ldots, M_{1,200}$, i.e., the memories $MB_1, MR_1$ and $MG_1$ during the next field period (including the vertical blanking period) as will be described later. It is needless to say in that event that informations stored in the field memories $FB_1$, $FR_1$ and $FG_1$ are separated and transferred in accordance with the image areas of the respective cathode ray tubes 8. In other words, the memories $MB_1$, $MR_1$ and $MG_1$ are each controlled so as to store 64 informations.

The image signals transferred to the special memories $MB_1$, $MR_1$ and $MG_1$ are read as follows. More specifically, read address signals RAx and RAy from the timing control circuit 68 are supplied to the special memories $MB_1$, $MR_1$ and $MG_1$ which are provided within the small memories $M_1$ to $M_{1,200}$. At that time, according to this embodiment, by controlling the read address signals RAx and RAy, the order of read operation is made in accordance with the vertical direction of the picture screen so that the image signals stored in the field memories $FB_1$, $FR_1$ and $FG_1$ and the special memories $MB_1$, $MR_1$ and $MG_1$ line by line and in the horizontal direction are read therefrom in the longitudinal direction (vertical direction) upon reading as shown in FIG. 16A.

The signals read from the special memories $MB_1$, $MR_1$ and $MG_1$ as described above are converted to serial signals by a switching signal fsw supplied from the timing control circuit 68. This will be described more fully with reference to FIG. 14. In response to the scanning positions of the display elements scanned at the same time, in particular, in the position of the blue fluorescent layer, a memory switch Sb for the blue signal is turned ON to permit the blue signal B memory $MB_1$ or $MB_2$ to derive a signal; in the position of the red fluorescent layer, a memory switch Sr for the red signal is turned ON to permit the red signal R memory $MR_1$ or $MR_2$ to derive a signal; and in the position of the green fluorescent layer, a memory switch Sg for green signals is turned ON to permit the green signal G memory $MG_1$ or $MG_2$ to derive a signal. Thus, the serially-converted BRG signals are obtained. Then, 1,200 serial signals are supplied through amplifiers $AMP_1$ to $AMP_{1,200}$ to the cathode ray tubes $8_1$ to $8_{1,200}$, and thereby a visual images is displayed.

While the switching signal fsw is represented by a single control line in FIG. 13, in practice, three control lines $f_{SW1}$, $f_{SW2}$ and $f_{SW3}$ are provided as shown in FIG. 14 and these three control lines $f_{SW1}$, $f_{SW2}$ and $f_{SW3}$ are supplied with switching signals whose phases are different as shown in FIG. 17.

The deflection method is also changed because the reading direction is changed to the vertical direction as described above. As shown in FIG. 16B, on the basis of the vertical synchronizing signal (17 msec: 60 Hz) V derived from the synchronizing separating circuit 66 (see FIG. 13), the horizontal deflections of the respective cathode ray tubes 8 are carried out at the same time. In FIG. 16B, reference letter $H_{CM}$ represents the horizontally-deflected waveform. Further, on the basis of the vertical deflecting signal Sv obtained from the timing control circuit 68 (see FIG. 13), the vertical deflections of the respective cathode ray tubes 8 are carried out simultaneously. In FIG. 16B, reference letter $V_{CM}$ represents the vertically-deflected waveform. The vertical deflecting signal Sv has a frequency of $8 \times 60 = 480$ Hz (2 msec) in order to scan 8 lines per field period (1/60 sec) because each cathode ray tube 8 has 8 lines in the vertical direction.

In the above-described embodiment, the image display apparatus of the invention is mainly used indoors so that it is provided with 1,200 cathode ray tubes. As a result, even when the input signal is the interlaced-scanning signal, the same portion is impinged in the odd field and the even field. The reason for this is that, when the large screen display apparatus is formed of 1,200 cathode ray tubes of a small number, this large screen display apparatus can afford only $8 \times 30 = 240$ lines in the vertical direction (the number of input scanning lines is 520). Therefore, note that the interlaced-scanning can be effected by increasing by twice the number of the cathode ray tubes. In addition, according to this embodiment, it is possible to omit the odd field or the even field.

The pairs of the field memories and the special or exclusive memories are provided for the three primary color signals R, G and B in the above-mentioned embodiment. For example, when the data transfer is effected during the vertical blanking period, one field memory and one exclusive memory may be instantaneously switched upon read and/or write operation, thereby reducing the number of memories by half.

Figure 1:
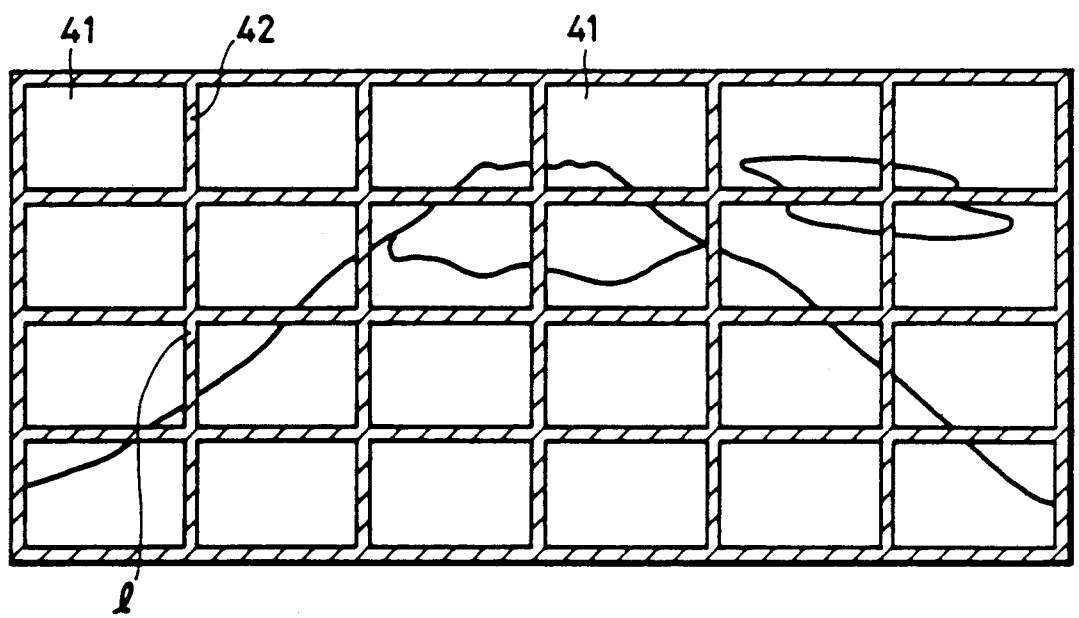
FIG. 1 is a front view showing an example of a large screen display apparatus according to the prior art.
Figure 2:
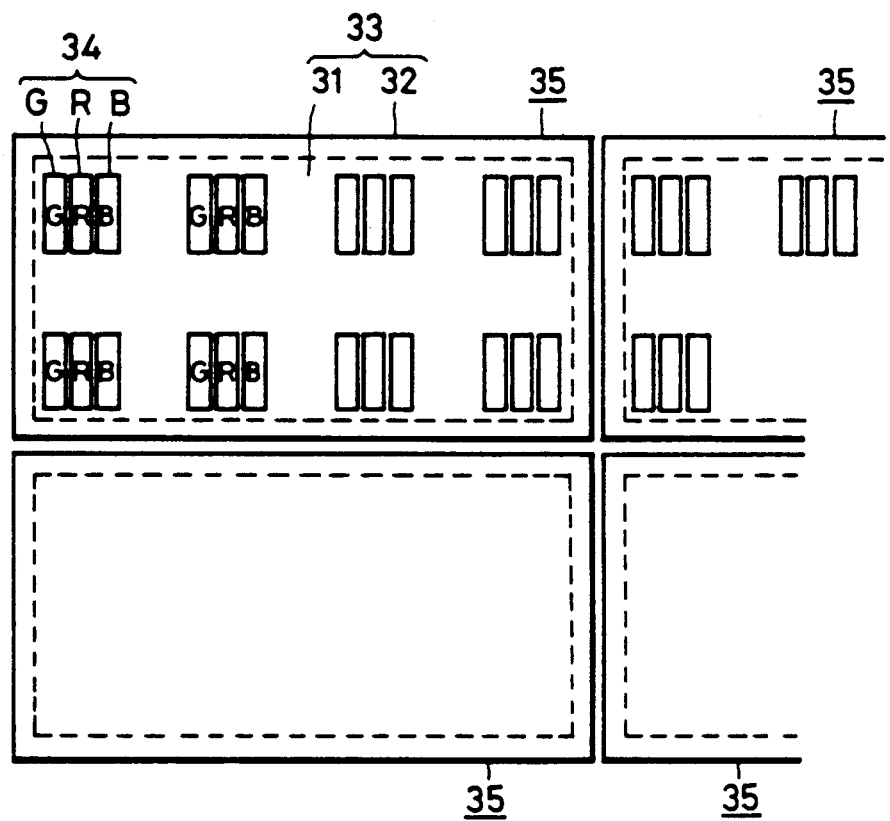
FIG. 2 is a front view of a main component of other example of a large screen display apparatus according to the prior art.
Figure 3:
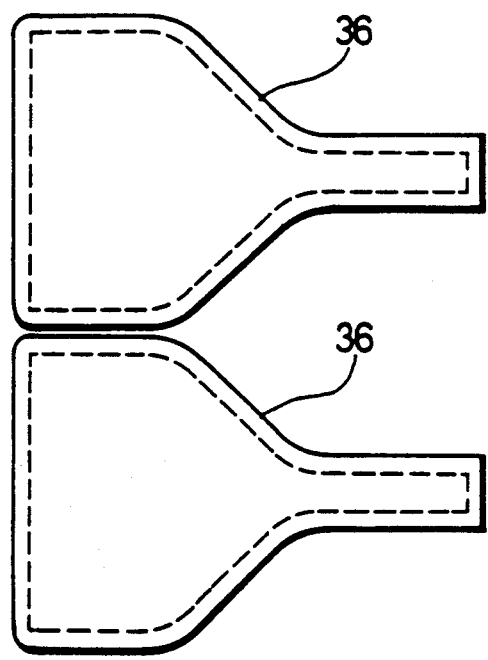
FIG. 3 is a side view of a section of a main component of other example of a large screen display apparatus according to the prior art.
Figure 4:
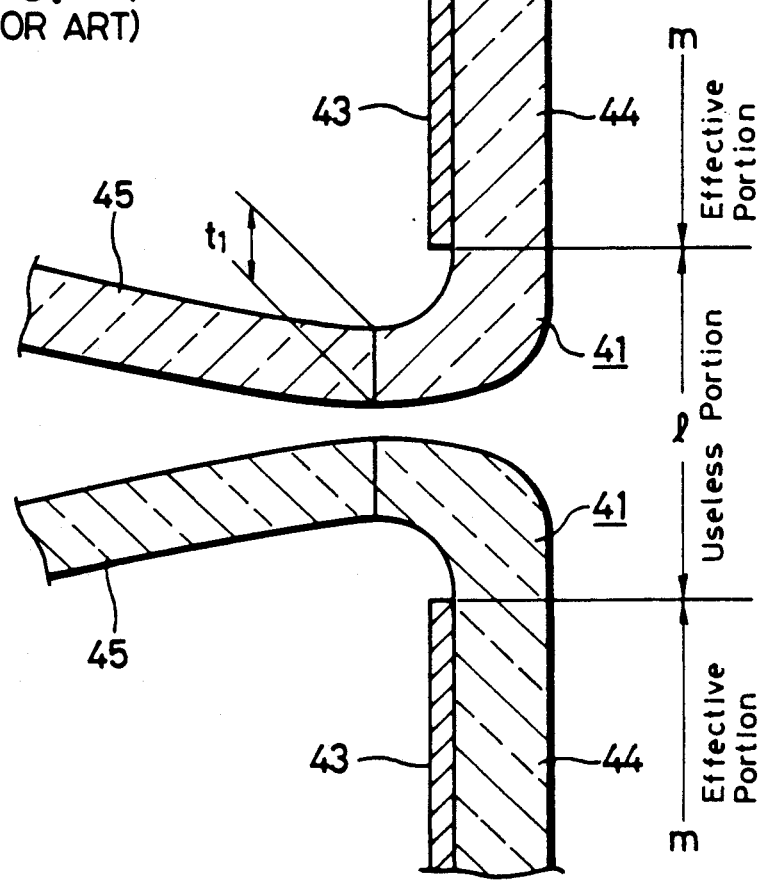
FIG. 4 is a side view of a section of a main component of other example of a large screen display apparatus according to the prior art.
Figure 5:
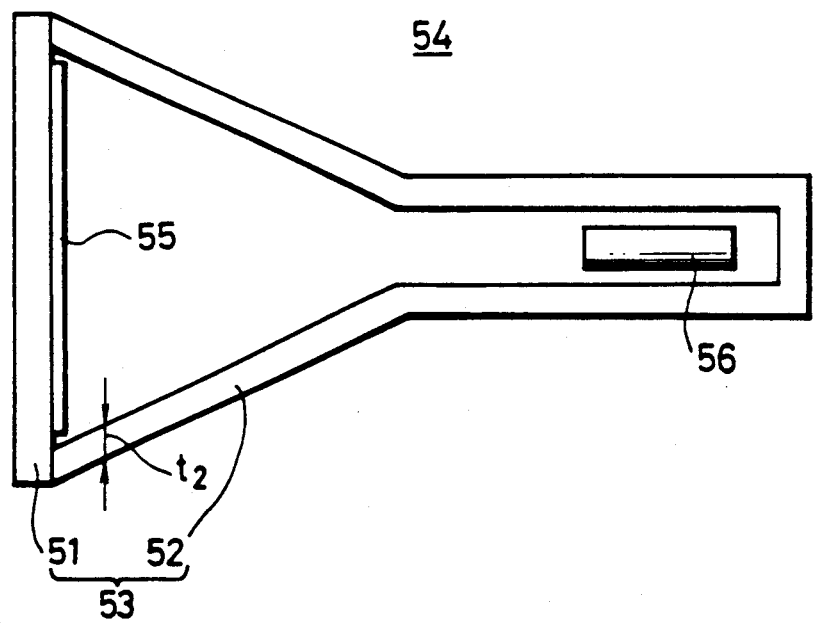
FIG. 5 is a side view of a cathode ray tube of another example according to the prior art.
Figure 6:
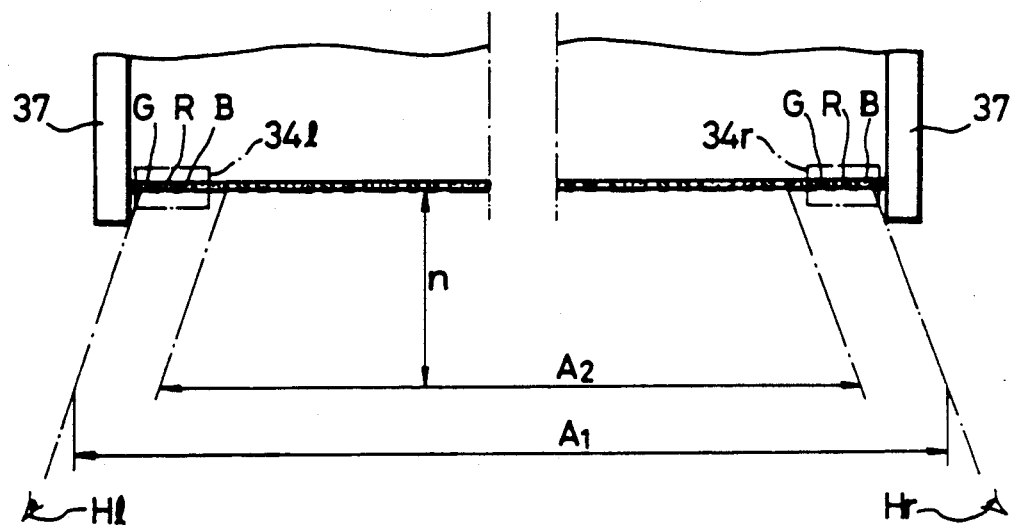
FIG. 6 is a top view of a main portion of a large screen display apparatus according to the prior art, and to which reference will be made in explaining the action of the prior art.

According to the above-mentioned cathode ray tube of the present invention, as shown in FIG. 9, the stepped portion 10 is provided at the peripheral edge portion of the inner surface of the flat panel 2 and the funnel 3 is bonded to the stepped portion 10 using frit glass 12, thereby forming the tube envelope 1. Therefore, the mechanical strength at the bonded portion can be increased, and the length of the bonded portion by the frit glass 12 can be increased, thereby obtaining sufficient dielectric strength. Consequently, the thickness $t_3$ of the funnel 3 at the screen side wall portion can be reduced, i.e., can be reduced to become less than ½ of the thickness $t_1$ according to the prior art of FIG. 4.

Further, the funnel 3 is bonded to the panel 2 at its stepped portion 10 so that, as compared with the tube envelope in which the funnel 3 is bonded to the side surface of the panel 2 in order to increase the mechanical strength and dielectric strength, a visual field angle $\theta_1$ ($\theta_1 > \theta_2$) can be increased. In other words, according to the arrangement of this embodiment, the loss of visual field angle due to the thickness $t_3$ of the funnel 3 in FIG. 18 can be removed.

Furthermore, according to the arrangement of this embodiment, as shown in FIG. 9, the fluorescent layer located at the side most end of the fluorescent screen 5 is provided outside the line n connecting the end portions of the panel and screen 5, and therefore the visual field angle $\theta_1$ can be substantially increased.

As set out above, according to the embodiment of the present invention, the cathode ray tube 8 is formed such that the fluorescent trios 4 of slit-configuration having a predetermined pitch P are formed on the display screen with their longitudinal directions directed in the horizontal direction (X direction). Thus, when the large screen display apparatus 11 is formed by arranging a number of cathode ray tubes 8 in a XY matrix fashion, the fluorescent trios 4 are provided between the adjacent cathode ray tubes 8 with the above-mentioned pitch P, and the bonded portions between the adjacent cathode ray tubes 8 act as the light absorption area of the fluorescent screen 5, thereby providing an image of high quality in which the bonded portion is inconspicuous.

In the cathode ray tube 8, the thickness $t_3$ of the funnel 3 at its screen side wall portion can be reduced so as to be less than ½ of the thickness $t_1$ of the prior art device so that the pitch P of the fluorescent trios 4 can be greatly reduced. Therefore, it is possible to obtain a large screen display apparatus of high resolution. In addition, since the outer peripheral surface 3a of the funnel 3 at its screen side wall portion of each of the cathode ray tubes 8 is formed as a flat surface, it is possible to arrange with ease the cathode ray tubes 8 in a XY matrix-fashion.

Figure 19:
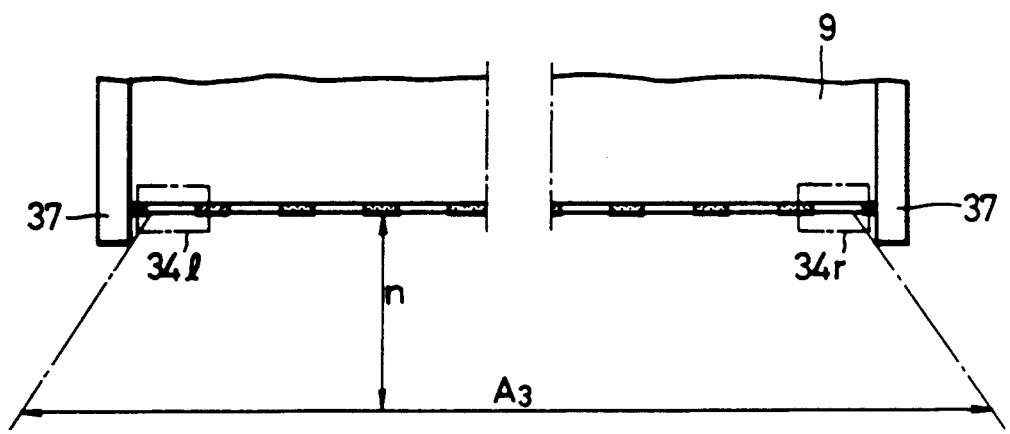
FIG. 19 is a top view of a main portion of a large screen display apparatus according to the present invention, and to which reference will be made in explaining the action of the large screen display apparatus according to the present invention.

As shown in FIG. 19, a phenomenon in which one of the fluorescent trios (shown by one-dot chain lines) 34l and 34r, located at the side end portions is hidden by the frame 37 when the user sees the picture screen from the lateral direction can be avoided so that the visual field range $A_3$ of the image that the display apparatus 9 displays relative to the predetermined distance n can be made wide as compared with the prior art ($A_3 > A_2$). Thus, the function of the large screen of the display apparatus of the invention can be demonstrated sufficiently.

The panel 2 of the embodiment of the invention is formed as the flat panel so that the flurorescent screen 5 can be made thereon by the printing-process, thus the manufacturing cost of the large screen display apparatus can be reduced considerably. Furthermore, when the large screen display apparatus is constructed as described above, the large screen, formed of a number of cathode ray tubes, can be seen as one picture screen.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

We claim as our invention:

1. A display apparatus comprising:
   (a) a display panel having a plurality of picture cells arranged in a XY matrix-fashion; and
   (b) a plurality of groups of luminous pixel elements, each having a stripe configuration and comprising three individual luminous elements, said plurality of luminous pixel elements arranged on the inner surface of a front panel of each of said picture cells with a predetermined pitch and with their longitudinal directions aligned in the horizontal direction, and with said groups of luminous pixel elements arranged in an XY matrix form, and wherein each of said picture cells is a cathode ray tube which is formed of a tube envelope, formed by bonding a front panel to a funnel, and with an electron gun and a deflection yoke mounted in said tube envelope.

2. A display apparatus according to claim 1, wherein said front panel and said funnel are made of glass and are bonded to each other with frit glass.

3. A display apparatus according to claim 1, wherein said self luminous pixel elements are a fluorescent trio formed of blue, red and green light emission fluorescent layers and said front panel is a fluorescent screen.

4. A display apparatus according to claim 1, further comprising a light absorption layer formed on those areas of the inner surface of said front panel where said self luminous pixel elements are not formed.

5. A display apparatus according to claim 1, wherein said front surface panel is a flat panel.

6. A display apparatus according to claim 1, wherein said cathode ray tube is a cathode ray tube in which a stepped portion is formed on the peripheral edge portion of said front panel and said funnel is bonded to said stepped portion.

7. A display apparatus according to claim 1, wherein said cathode ray tube is a cathode ray tube in which said funnel has its portion adjacent said front panel tapered so as to reduce its thickness in the region where said funnel is bonded to the front panel to allow said display apparatus to be viewed over a wide angle.

8. A display apparatus according to claim 6, wherein said stepped portion is located outside of a line connecting the self luminous pixel element adjacent to said stepped portion of said front panel and the end portion of said front panel.

9. A large area display comprising a plurality of cathode ray tubes mounted adjacent each other in an XY matrix and each cathode ray tube including a plurality of pixels arranged in an XY matrix on a front panel of said cathode ray tube and each pixel comprising three horizontally extending stripe shaped luminous element aligned in the vertical direction, each cathode ray tube having a funnel, and each of said front panels having a thinner stepped portion adjacent its outer edge into which said funnel is received and attached so that the spacings between adjacent cathode ray tubes is a minimum and the pixels can be viewed over a wide angle.

* * * * *